(12) United States Patent
Struble et al.

(10) Patent No.: US 11,367,118 B1
(45) Date of Patent: *Jun. 21, 2022

(54) METHOD, SYSTEM, AND MANUFACTURE FOR MIN-COST FLOW ITEM RECOMMENDATIONS

(71) Applicant: Amazon Technologies, Inc., Seattle, WA (US)

(72) Inventors: Dale Struble, Seattle, WA (US); Rahul Makhijani, Stanford, CA (US); Yi Liu, Seattle, WA (US); Shreya Chakrabarti, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 443 days.

This patent is subject to a terminal disclaimer.

(21) Appl. No.: 16/198,341

(22) Filed: Nov. 21, 2018

(51) Int. Cl.
*G06Q 30/00* (2012.01)
*G06Q 30/06* (2012.01)

(52) U.S. Cl.
CPC ......... *G06Q 30/0631* (2013.01); *G06Q 30/06* (2013.01); *G06Q 30/0641* (2013.01)

(58) Field of Classification Search
CPC .............. G06Q 30/0601–0645; G06Q 30/08
USPC ............................................... 705/26.1–27.2
See application file for complete search history.

(56) References Cited

U.S. PATENT DOCUMENTS

| 7,778,773 | B2* | 8/2010 | Yaqub | G06Q 10/047 |
|---|---|---|---|---|
| | | | | 701/414 |
| 9,223,900 | B2* | 12/2015 | Jebara | G06F 16/9024 |
| 9,805,402 | B1* | 10/2017 | Maurer | G06Q 10/087 |
| 2015/0073929 | A1* | 3/2015 | Psota | G06Q 30/0241 |
| | | | | 705/26.2 |
| 2017/0330218 | A1* | 11/2017 | Deshpande | G06Q 30/0635 |

OTHER PUBLICATIONS

"Trading off among accuracy, similarity, diversity, and long tail: A graph based recommendation approach" by Lei Shi 7th ACM conference on recommender systems (Year: 2013).*
Christakopoulou et al., "Recommendation with Capacity Constraints", CIKM '17, Nov. 6-10, 2017, Singapore, 10 pages.
Cohen et al., "The Impact of Linear Optimization on Promotion Planning", SSRN Electronic Journal, Jan. 2014, pp. 1-58.

* cited by examiner

*Primary Examiner* — Jeffrey A. Smith
*Assistant Examiner* — Lindsey B Smith
(74) *Attorney, Agent, or Firm* — Kilpatrick Townsend & Stockton 1.1 P

(57) ABSTRACT

Techniques are provided for optimizing a graph. The graph can be generated with a source node, a plurality of item nodes, and a terminal node. Once generated, the graph can be optimized to determine a lowest cost flow from the source node to the terminal node based at least in part on respective budget measurements. A first account node and a first item node can be determined and an account corresponding to the first account node, as well as information that identifies an item corresponding to the first item node can be transmitted.

20 Claims, 8 Drawing Sheets

METHOD, SYSTEM, AND MANUFACTURE FOR MIN-COST FLOW ITEM RECOMMENDATIONS

BACKGROUND

Optimally recommending items to accounts, in order to maximize an objective function, is commonly encountered in various industries. When this optimization is subject to eligibility constraints (e.g., not every account is eligible for all items) and item capacity (e.g., a limited quantity per item), as is usually the case, then it becomes more complex to solve. Existing recommendation approaches rank items, ignoring eligibility, and have a downstream system that filters the ranked list of items based on eligibility rules, which often leads to a sub-optimal solution. These approaches also commonly enforce strict capacity constraints downstream after optimization or model it not-strictly (e.g., satisfying the constraints on average), both of which are sub-optimal. Finding better techniques to optimize such problems continues to be a challenge.

BRIEF DESCRIPTION OF THE DRAWINGS

Various embodiments in accordance with the present disclosure will be described with reference to the drawings, in which.

DETAILED DESCRIPTION

Figure 1:
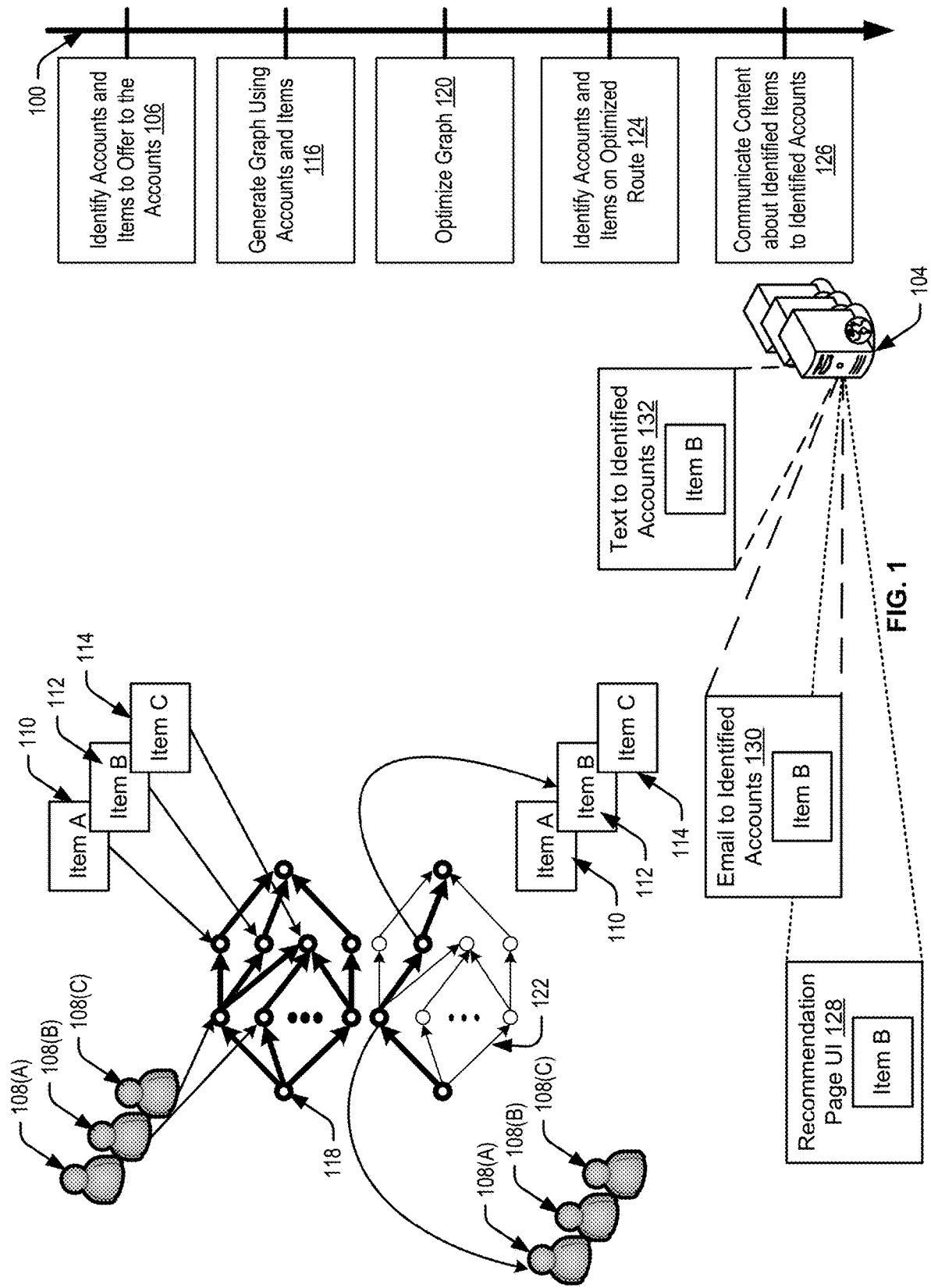
FIG. 1 illustrates a flow for providing min-cost flow item recommendations, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The techniques described herein include, at least in part, utilizing a minimum cost flow ("min-cost flow") algorithm to determine an item (e.g., an offer) to provide to an account (e.g., a user). In some examples, a service provider or other entity (e.g., a business) may have various items that are available to be offered to one or more accounts or users of the service provider or entity. However, various constraints may be in place that make it such that not all accounts can be provided every item and/or there may not be enough items to provide to everyone. One way to determine which items are to be provided to which accounts is to solve the min-cost flow problem using a graph with nodes that represent the accounts and items, and edges (pipes) that represent the constraints. In this way, a directed graph can be used to optimize the determination of which accounts get which items.

In some examples, a service provider (e.g., an online retailer or the like) may have various items and/or sale offers that it wants to provide and/or offer to users. Items can include any tangible or virtual things that can be offered (e.g., for free, for sale, for rent, etc.). Some examples of items include books, compact discs, clothes, virtual/streaming media, coupons, recommendations, or the like. The users may be current members (e.g., with a registered account) or potential members (e.g., may still be considered an account, but may not be registered, subscribed, or a paying member). The service provider may determine (or provide the data to a third-party (e.g., a different service provider)) which item or items (e.g., in some examples, one item may be provide; however, in other examples, multiple items can be provided) to offer to which accounts based at least in part on identifying a min-cost flow solution. In some examples, this may be identified by generating a directed graph with nodes and edges that represent various parts of the min-cost problem to be optimized. For example, there may be a source node, account nodes, item nodes, and a terminal node. The edges may represent the various constraints that are important to the service provider.

A customer c can be assigned at most $K\_c$ items (unique or with repetition) from a list of N potential items. Each unique item i is capacity constrained globally by a capacity $C\_i$. In addition, each customer c is eligible for at most $q_{\{C,i\}}$ quantity of item i (ineligibility would imply $q_{\{C,i\}}=0$). The items can be allocated to customers such that the overall objective function (such as profit/revenue from all items N across all customers C) is maximized while also meeting these capacity and eligibility constraints. In order to do this, the constrained optimization problem is formulated as a min-cost flow problem and an efficient linear programming solver (the network simplex algorithm) is leveraged to solve the problem in polynomial time. In some cases, exactly one item can be allocated to each customer from a list.

In one specific example, a subscriber (e.g., paying member of the online retailer) offer (e.g. a monthly/annual plan) to a non-subscriber customer or offering a promotion (e.g., $5, $10, $20, etc., subscription account coupon, or a $5, $10, $20, etc., subscription account credit) to a subscribed member from a set of available promotions. Using a min-cost flow algorithm, based at least in part on a directed graph that represents the relevant accounts/items can provide a more efficient and optimized solution to the constrained optimization problem. An additional advantage of the techniques described herein is the ability to give variable length recommendations to a customer. For example, one item can be recommended to one customer while three (or any other number greater than one) can be recommended to another customer.

The following constraints can be utilized in the techniques described herein:
  Eligibility (@customer item level)
  Item Capacity Constraint (@item level, max #items in the system)
  Customer Capacity <=K_c items (@customer level, max number of items a customer can be given).
  Max @customer_item level (maximum quantity of an item that can be given to a customer).

While the techniques herein are described from the perspective of an online retailer or other retail service provider, any constrained optimized problem can be more efficiently and optimally solved using the techniques described herein. Additionally, while various examples describe use of directed graphs (e.g., directed acyclic graphs), any known (or currently unknown) techniques for solving the min-cost flow problem using the appropriate constraints can be used. Additionally, using the techniques described herein provides for a solution in the polynomial space (e.g., it can be solved in a finite amount of time, and significantly faster than using previous techniques). Thus, there are computational efficiencies realized by using the techniques described herein, because the problem can be solved in less time and/or with less computations. Further, there are various memory efficiencies realized by utilizing the techniques described herein, especially using the online techniques and described below and/or with the use of the propensity scores noted below. The clustering approach, also described below, can also provide computational efficiencies.

FIG. 1 is a block diagram illustrating an example flow 100 for describing example techniques for optimizing a constrained item recommendation problem, in accordance with at least one embodiment. In some examples, service provider computers 104 can perform instructions to perform the flow 100. At block 106, the service provider computers 104 may identify one or more accounts (e.g., accounts 108(A), 108(B), and 108(C)) and one or more items (e.g., item A 110, item B 112, and item C 114) that can be offered to the accounts 108(A), 108(B), and/or 108(C). At block 116, the service provider computers 104 may generate a graph 118 using the accounts and items. For example, the graph 118 may include a source node (e.g., the far left node), a plurality of nodes that represent the accounts 108, a plurality of nodes that represent the items 110, 112, 114, and a terminal node (e.g., the far right node). In some examples, the source node has edges (pipes) directed towards the account nodes, the account nodes have edges directed towards the item nodes, and the item nodes have edges directed towards the terminal node. The edges can be configured with costs that correspond to eligibility measures and budget measures (e.g., the constraints noted above) as well as capacities of the edges from a flow perspective.

At block 120, the service provider computers 104 can optimize the graph by executing a min-cost flow algorithm on the graph. For example, a min-cost flow solution may be determined using the respective costs and/or capacities and one or more known min-cost flow techniques. The bold nodes and edges of graph 122 represent an example solution to the min-cost flow problem with the given graph 118. In some examples, optimizing the graph may include identifying a set of routes that aggregate to a lowest cost flow, where the total flow of the graph is optimized to be the lowest possible, even if each individual route is not the lowest possible for that route. At block 124, the service provider computers 104 may identify accounts and items on an optimized route of the graph. For example, the account node on the optimized flow may correspond to the first account in this example (e.g., account 108(A)) and the item node on the optimized route may correspond to the second item in this example (e.g., item B 112). Thus, at block 124, account 108(A) and item B 112 may correspond to a route on the most optimized flow, and item B 112 should be offered to account 108(A). Additionally, other offers may be provided to any of the other account/offer pairs corresponding to routes on the optimized flow.

In some examples, the service provider computers 104 can communicate content about the identified items (e.g., Item B) to the identified accounts (e.g., account 108(A) at block 126. For example, a recommendation page UI 128 can be generated and presented on a Web page. The recommendation page UI 128 may be configured to recommend Item B to account 108(A) (e.g., if a user of account 108(A) is logged into a website hosted by or otherwise associated with the service provider computers 104). Additionally, in some examples, the service provider computers 104 may be configured to generate an email 130 and/or a text 132 to be sent to the user associated with account 108(A). The email 130 and/or text 132 may include information that identifies Item B and may include a recommendation or offer for Item B. The email 130 and/or text 132 may be transmitted to the user. Additionally, in some instances, the operations of blocks 106-124 can be performed in an "offline" mode (e.g., during a time other than while users are accessing the system, sometimes after regular business hours or when computing resources are freed up from regular user traffic). Additionally, in some examples, the operations of block 126 may be performed in an "online" mode. For example, the recommendation page UI 128, email 130, and/or the text 132 may be generated and/or communicated to the users of the accounts 108 while the user is accessing the system. Additionally, the content of the UI 128, email 130, and/or text 132 may include a navigation link for the item/account pair.

In some examples, the task of navigating a large electronic catalog of items (e.g., a catalog with millions of items) to locate items of interest can be burdensome and time consuming for users, especially if the users do not know the names or generic descriptors of the desired items. Typically, the user can locate items by navigating a browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the items of interest are not accurately or intuitively categorized, requiring the user to perform additional navigation or keyword searching. Thus, the user frequently has to perform numerous navigational steps to arrive at the catalog page or "item detail page" of interest.

Another technological advantage of the present disclosure is that the use of machine learning models to identify similar items enables the creation of user interfaces that allow users to identify items of interest with fewer clicks, scrolls, and/or page navigations that would otherwise be required to assess items for similarity to a source item. For example, in the embodiments described herein, when the user is presented with one or more item recommendations, each item recommendation includes, or is in the form of, a link to the catalog's item detail page for the corresponding item, allowing the user to navigate directly to this page. Each recommendation thus serves as a programmatically selected navigational shortcut to the item's detail page or description, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult.

Figure 2:
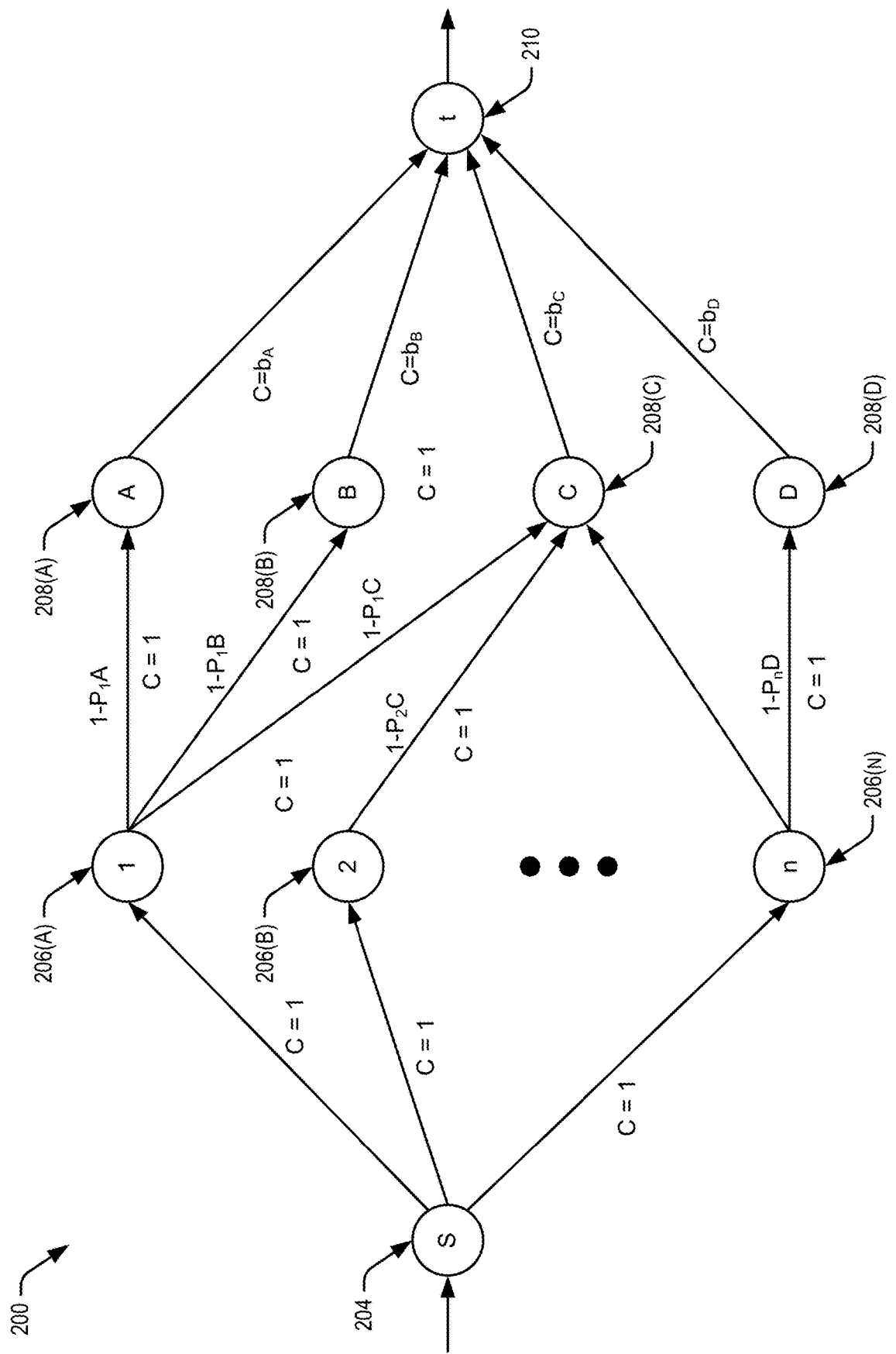
FIG. 2 illustrates a block diagram illustrating exemplary techniques for providing min-cost flow item recommendations, in accordance with at least one embodiment.

FIG. 2 is a block diagram illustrating an example reduction to min-cost flow for graph 200. In graph 200, a source node 204 has edges directed at (pointing to) customer node 1 206(A), customer node 2 206(B), and customer node n 206(n), collectively customer nodes 206. Customer nodes 206 have edges directed at item node A 208(A), item node B 208(B), item node C 208(C), and/or item node D 208(D), collectively item nodes 208. Item nodes 208 have edges directed at terminal node 210.

In some example, membership with the service provider may be a core component of a business model. Thus, a Free Trial ("FT") may be the best tool to acquire additional members. However, customers may be generally limited to a single FT in a particular period of time (e.g., a 10-month period, a 12-month period, or the like). Additionally, in some cases, there may be a large pool of non-members who are ineligible for FTs. On option is to offer a shorter Paid Trials ("PT"; e.g., one week of membership for some set price (e.g., $0.99, $1.99, $2.99, or some other value less than a full membership)), and a second FT to otherwise FT ineligible customers. In some cases, FT may lead to a higher yield (e.g., a 25-day, 35-day, 45-day member yield, or the like (e.g., 40% increment, 60% increment, or the like) than a Hard Offer ("HO"; e.g., a straight offer for a product where the payment is expected prior to receipt of the item (in this case, a membership)) over some period of (e.g., 4 week, 6 weeks, 8 weeks, or the like (some HO member yield vs some higher FT re-eligibility ("RE") member yield)). Thus, in some cases, it may be desired to maximize the settled conversion of customers through PT/FT/HO plans (read offer types) over a one-year period, subject to budget constraints (limiting the number of FTs and PTs offered) and eligibility constraints. An example of a budget constraint would be to offer FTs and PTs to at most some lower percentage and some higher percentage, respectively, of the population. Further, the techniques described herein can be extended to handle multiple offers and solve for any other conversion metrics.

In some examples, an optimization problem is solved where each customer can be offered an integer number of offers among n offers {O1, O2, . . . , On} where each offer j has budget bj (Offer j can be given to at most bj customers). There further exists eligibility constraints (e.g., certain customers might not be eligible for certain kind of offers). The objective is to maximize the conversion rate of customers into a paid subscriber d number of days after the offer benefits are over. For customer i, the propensity to convert given offer j is denoted by P (Y F, O, H) where F and H denote the customer feature attributes and history of past offers, respectively.

$$\max \sum_{i \in N} \sum_j P(Y \mid F, O_j, H) X_{ij} \quad (1)$$

$$\text{s.t.} \sum_j X_{ij} \le c_i \quad (2)$$

$$\sum_i X_{ij} \le b_j \; \forall_j \quad (3)$$

$$X_{ij} \in \{0, 1, \ldots o_{ij}\} \quad (4)$$

The above equations measure the overall expected number of settled customers which can be optimized leveraging the propensity models. The first constraint refers to total number of offers of each kind that can be offered to customer i. The second constraint corresponds to budget constraints of offers. The third constraint refers to the amount of offer j that can be offered to customer i. Ineligibility of customer i for offer j can be modeled by setting oij to 0. The above set of equations can be converted to a min-cost flow.

Note that the above equations are a special case of an integer program as defined below (written in a matrix form). The general integer program is described by the equations below:

$$\max q^T x \quad (5).$$

$$s.t. Ax \le b \quad (6)$$

$$x \in I \quad (7)$$

Here $x \in R^d$ is a d dimensional vector taking integer values. p is the objective vector. In general an integer program can be solved via relaxation to a linear program when the vector b is integral and matrix A is totally unimodular (if every minor has determinant+1 or −1). The conversion of the problem to a min-cost flow ensures that the matrix A is totally unimodular. The reduction is specifically shown for the case when each customer is given exactly one offer. For example, the second equation above can reduce to:

$$\Sigma_j X_{ij} = 1 \text{ and } X_{ij} \in \{0,1\},$$

As noted, FIG. 2 illustrates a min-cost flow using graph 200. The capacity and cost of transporting a unit flow through a pipe (edge) from source node s to customer node is 1 and 0 respectively. The capacity and cost of transporting a unit flow through a pipe from a customer node to offer node O is 1 and 1, po, respectively. The capacity and cost of transporting a unit flow through a pipe from an offer node O to terminal node t is co and 0, respectively. A flow of n is sent through source node s.

The service provider may want to maximize the settled 45-day conversion of former members ("FMs") through PT/FT/HO plans over a one-year period subject to budget constraints (e.g., limiting the number of FTs and PTs offered) and eligibility constraints. This framework can easily be extended to handle multiple offers and solve for any x-day settled conversion metric. There are several approaches to model how to optimally offer PT/FT/HO plans. Specifically, it may be desired to determine which plan and when to offer it over the first 12 months after becoming a former member (e.g., after which the account may become FT eligible again by default). As a simplification, the 12-month period can be broken into quarters and the problem can be framed as having to determine which plan to show for each quarter (e.g., quarterly is chosen to present a better customer experience and to reduce the problem). For example, it may be chosen to offer HO for the first six months, PT in the next 3 months, and then FT in last three months if conversion has not happened till then. This sequence of offers may be better than offering FT throughout as it prevents wastage of FT if the FM can be converted with PT/HO alone. Offering FT throughout also modifies the member behavior and potentially makes them strategic (e.g., an FM might delay shopping until during Black Friday sales in November and use the FT during then).

A competing approach is to have a blanket policy in which it the optimal sequence in which to offer these plans overall is determined. That is, a single optimal sequence that applies to everyone (e.g., always offer PT, then FT, then HO). This approach does not easily work in the presence of constraints (where it is desired to limit FTs or PTs) and may not be optimal in terms of member yield.

Similarly, other customized approaches to offering these three plans to customers may be determined. For example, a random policy can be used to assign the offers in a random manner (e.g., while maintaining the budget constraints). Secondly, a ranking based policy can also be used that offers FT to the FMs having the highest FT propensity and then PT is offered among the remaining FMs to ones having the highest PT propensity. However, this may actually result in a suboptimal solution.

Although it is possible to show a particular offer for a variable number of months, a particular kind of trial (FT/PT) may be offered at quarterly intervals. An example of such a strategy is -HO, PT, PT, FT where HO is offered in the first quarter, PT is offered in the second and third quarters, and FT is offered in the fourth quarter. This has the benefits of (a) ensuring that an FM sees a particular kind of trial offer at least once and (b) improves customer experience by avoiding whiplash effect (e.g., seeing a different kind of trial every time an FM comes to shop) since shopping patterns tend to be sporadic and the actual number of times an FM shops in a month might vary (e.g., some number of time (like 1.2 times, 1.33 times, 1.5 times, or the like) a month on average).

In some instances, the problem of maximizing the expected settled yield can be solved under an optimization framework where it is determines which FMs are to be offered FT, PT, and HO, respectively, depending on their propensity of conversion and budget constraints in each quarter. The optimization objective is to maximize the expected 45-day settled yield over each quarter. An optimization model can be built that answers the timing and sequence of ramp up offers quarterly that maximizes the total paid member balance from former members. This model will optimally assign FT/PT/HO to an FPM which can be strictly enforced for the next three months.

Figure 3:
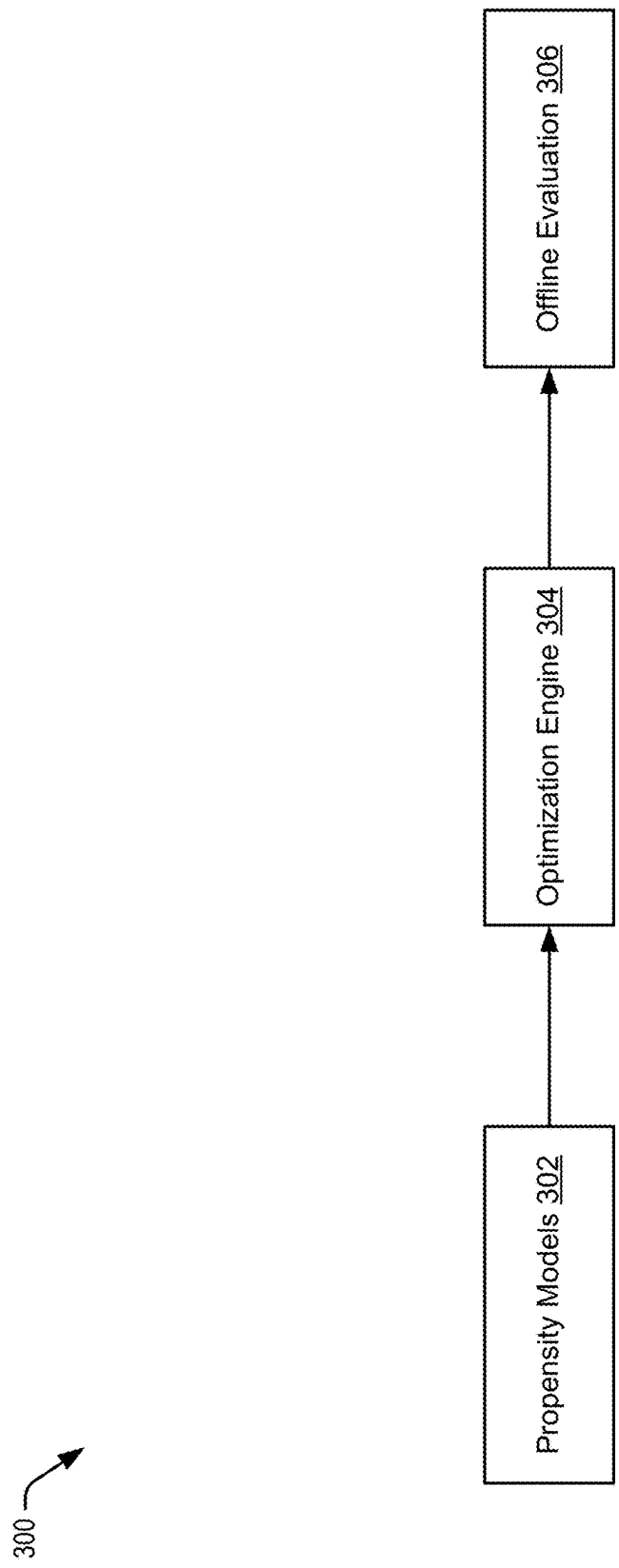
FIG. 3 illustrates another flow for providing min-cost flow item recommendations, in accordance with at least one embodiment.

FIG. 3 illustrates the overall workflow 300. In some examples, there may be three stages: (a) Propensity Models 302 (b) Optimization Engine 304, and (c) Offline Evaluation 306. The optimization engine 304 may require the estimation of the propensity to become a 45-day settled member based on historical features, previous history of offers, and current type of offer being presented. Finally, the policy (offer assignment) may be fed into the offline evaluator 306 that evaluates the performance of the new policy.

For the first stage of the project, models may be developed that predict the propensity for a given FM i becoming a Paid Member (PM) through an FT, PT, or HO. It can be estimated using an optimization framework:

$$P_i(Y_{45d}|O)$$

where $$Y_{45} = \begin{cases} 1 \text{ if 45 day settled member} \\ 0 \text{ else} \end{cases}$$

O=Current Offer Type $\in$ {HO, FT, PT}

In some cases, the data from PT and FTRE experiments can be used, and the $P(Y_{45d}|O)$ estimates can also be used in the optimization framework and offer FT and PT to the corresponding FMs. The following equation measures the overall expected number of settled FMs which can be optimized leveraging the propensity models.

$$E[\text{settled yield}] \Sigma_i P_i(Y_{45d}|HO) X_{\{i,HO\}} + P_i(Y_{45d}|FT) X_{\{i,FT\}} + P_i(Y_{45d}|PT) X_{\{i,PT\}}$$

where $$X_{\{i,FT\}} = \begin{cases} 1 \text{ if } FPM \ i \text{ is offered } FT \text{ in this quarter} \\ 0 \text{ else} \end{cases}$$

$$X_{\{i,HO\}} = \begin{cases} 1 \text{ if } FPM \ i \text{ is offered } HO \text{ in this quarter} \\ 0 \text{ else} \end{cases}$$

$$X_{\{i,PT\}} = \begin{cases} 1 \text{ if } FPM \ i \text{ is offered } PT \text{ in this quarter} \\ 0 \text{ else} \end{cases}$$

Additionally, the condition $X_{\{i,FT\}} + X_{\{i,PT\}} + X_{\{i,HO\}} = 1$ can be applied for each FM since only one offer can be made to each FM. In addition to the above, the constraints $\Sigma_i X_{\{i,FT\}} \leq Nf_1$ and $\Sigma_i X_{\{i,PT\}} \leq Nf_2$ which limit the number of FTs and PTs handed out can be utilized (e.g., $f_1$ and $f_2$ are the respective population-level fractions of FTs and PTs handed out.) The objective here is to maximize the expected 45-day settled yield. However, the total number of FTs and PTs handed out can be constrained, which provides additional flexibility. One value effectuated here, is maximizing the settled yield given the constraints. Additionally, the following limits are added on the number of FTs and PTs as constraints. As an illustration, FT can be offered to 30% of the FMs (whichever FT—eligible) and PT to 50% of FMs. These percentages (30% and 50%) can be changed as desired. Further, the FM optimization problem can be re-solved each week/month as the number of FMs can change per month (e.g., some may have already converted and newer FMs may arrive every week/month).

Clustering Based Solution

In some examples, the current solution could be scaled for application to a large population by the idea of clustering, specifically when all customers want the same number of items/offers. Thus, the population can be clustered into various groups (e.g., based at least in part on feature similarity) and assign an offer to the entire cluster. In some instances, hierarchical clustering can be used to cluster the population features into k clusters (e.g., k=100) such that all clusters are of roughly the same size. The optimization can then be rerun on clusters (e.g., clusters are now treated as individuals) and everyone in the cluster is given the same offer. This would speed up the optimization problem by an order of magnitude at a slight expense of accuracy. The above set of equations can be modified as follows:

$$\max \sum_{i \in K} \sum_j \tilde{P}_{ij} X_{ij} \qquad (8)$$

-continued $$\text{s.t.} \sum_j X_{ij} \leq c_i \quad (9)$$

$$\sum_i X_{ij} \leq |K| f_j \forall_j \quad (10)$$

$$X_{ij} \in \{0, 1\} \quad (11)$$

where $X_{ij}$ denotes the indicator variable where cluster i receives offer j, K denotes the set of all clusters {1, 2, ..., k}, $f_j$ denotes the fraction of clusters that are offered offer j. The profit of assigning an offer j to cluster i is the sum of the profits of assigning an offer j to all people in the cluster. Hence, we have the equation $\tilde{P}_{ij} = \Sigma_{q \in i} P(Y_q | F, O_j, H)$.

Real Time Solution

In some examples, a real-time solution may be employed. In this case, the entire time period may be divided into n time intervals $(0, T_1), (T_1, T_2), \ldots (T_{n-1}, T_n))$ (note: the time periods need not be equal). Think of the first period as an initial learning stage. The algorithm has the following steps:

1. All customers arriving in the first time period $\{0, T_1\}$ are shown offers randomly. The set of customers arriving in the first time period constitutes the training set (e.g., show offers randomly to the population and observe successes). This training set is now used to build the propensity models. The random policy is chosen so that proportionate budget constraints are respected.

2. The propensity models are built on the above training set based on offer successes and failures. The min-cost solution/optimization program is run with budget constraints (e.g., using clustering if the size is large) on the above training set after the propensity models have been built. The solution of min-cost flow now provides new offer labels for each customer. The new label for each customer is exactly the offer given after solving the min-cost flow solution problem. Note the min-cost flow and clustering are applied to only the training set.

3. The problem is now treated as a multi-classification problem with new labels arising from the min-cost flow solution. A one vs all multi-classifier is then built on the above training set data with customer features and the new labels.

At this point, the initial learning stage is complete. For the remaining time steps the following procedure is performed:

1. For each newly arrived customer in the next time period, the propensity of each customer to belong into each of the classes is estimated. The propensities are then multiplied by a penalty function which depends on the remaining budget of each class offer. The penalty function can be any convex decreasing function (e.g. linear, exponential). This is similar to the inventory budget balancing algorithm. As an example, the offer $$\underset{o}{\text{argmax}} \{p_O \Phi(b_O)\}$$

is chosen, where $\phi$ is the penalty function depending on the remaining budget of the offer.

2. After all customers of population in the next time period have arrived, the propensity models can be retrained based at least in part on the offer successes and failures.

Sequential Solution

Figure 4:
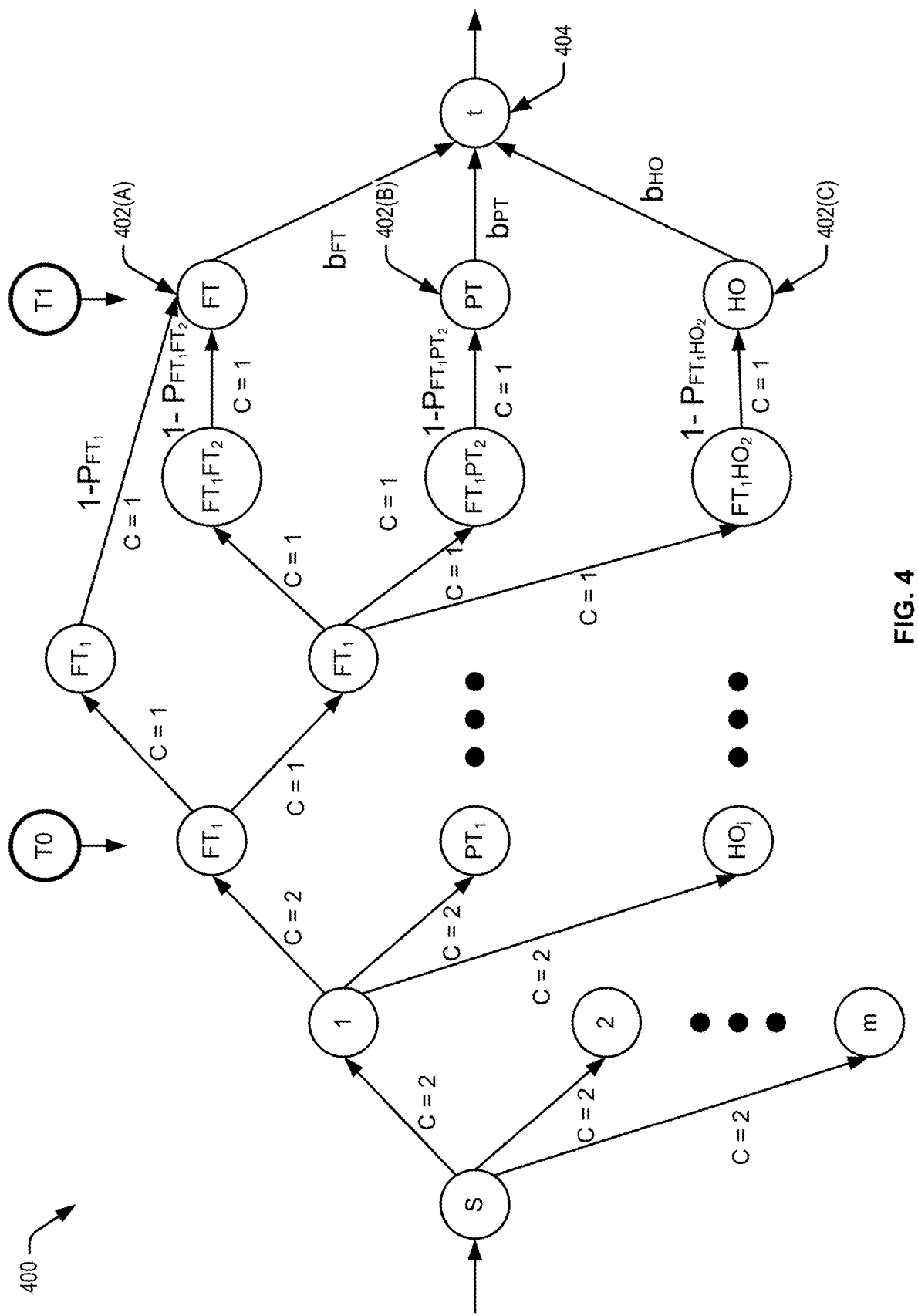
FIG. 4 illustrates another block diagram illustrating exemplary techniques for providing min-cost flow item recommendations, in accordance with at least one embodiment.

In some examples, the min-cost flow techniques can be performed sequentially. For example, an optimization model can be built that answers the timing and sequence of ramp up offers quarterly that maximizes the total paid member balance from former members. This model will optimally assign an offer to a customer which will be strictly enforced for the next period of time (e.g., three months in some cases when offers are made every quarter). The equations below can be utilized for the two time period case and it can be converted to a min-cost flow as shown in FIG. 4.

$$\max \sum_{i \in N} \left\{ \sum_j P(Y | F_i, H_i) X_{iO_j} + \sum_j \sum_k \tilde{P}(Y | F, O_j, H_i) X_{iO_j O_k} \right\} \quad (12)$$

$$\text{s.t.} \sum_j X_{iO_j} \leq c_i \quad \forall_i$$

$$\sum_k X_{iO_j O_k} \leq c_i \quad \forall_j \& k$$

$$\sum_k X_{iO_j O_k} \leq X_{iO_j} \quad \forall_i \& j$$

$$\sum_i X_{iO_j} + \sum_i \sum_k X_{iO_k O_j} \leq b_j \quad \forall_j$$

$$X_{iO_j} \in \{0, 1, \ldots o_{ij}\} \quad \forall_i \& j$$

$$X_{iO_j O_k} \in \{0, 1, \ldots o_{ik}\} \quad \forall_i \& j$$

Here, the indicator variable $X_{iO_j}$ denotes the fact that customer i is offered offer j in period one and indicator variable $X_{iO_j O_k}$ denotes the fact that customer i is offered offer j in period one and offer k in period two. The first two constraints refer to total number of offers in all that are offered to customer i. The third constraint ensures consistency between the indicator variables. The fourth constraint refers to the capacity of offer j that can be offered to customers. The idea could be extended to multiple time periods as well.

FIG. 4 illustrates a graph 400 for the conversion of a sequential two time period optimization problem to a min-cost flow. The values below the arrows indicate the capacity of the pipes (edges) and the values above the arrows indicate the cost of sending a flow through the pipe (edge). Note: the final nodes (e.g., 402(A), 402(B), and 402(C)) before terminal node t 404 correspond to total offers and only pipes from those nodes have a cost. All other pipes have a cost of 0.

In some examples, the sequential processing may be configured to provide offers every quarter (e.g., 3 months). However, any time period can be used. In the example of FIG. 4, a different offer may be provided each quarter (e.g., at T0 and then at T1) in the model. At T0, a first offer FT (e.g., FT1) may be provided, and then another FT offer at T1. However, in a separate route, the model shows a first FT offer at T0 and then a PT offer at T1. Alternatively, in another route, the model shows a first FT offer at T0 and then an HO offer at T1. Similarly, even though not illustrated in FIG. 4, the model could offer a PT offer at T0 followed by each of an FT, PT, and HO offer in T1, or the model could offer an HO offer at T0 followed by each of the aforementioned FT, PT, and HO offers in T1. In this way, the respective costs can be calculated for the sequential offers at T1 using the same type of min-cost flow solution described above. The solution to the min-cost flow algorithm would provide a result of sequential offers to provide to customers, instead of just identifying the lowest cost offers for a particular time period. Further, one of ordinary skill in the art will understand how this model could be used to identify best offers to provide to users using any types of offers (e.g., including physical/retail items), and the techniques described herein should not be limited to offering free trials, paid trials, or hard offers.

Figure 5:
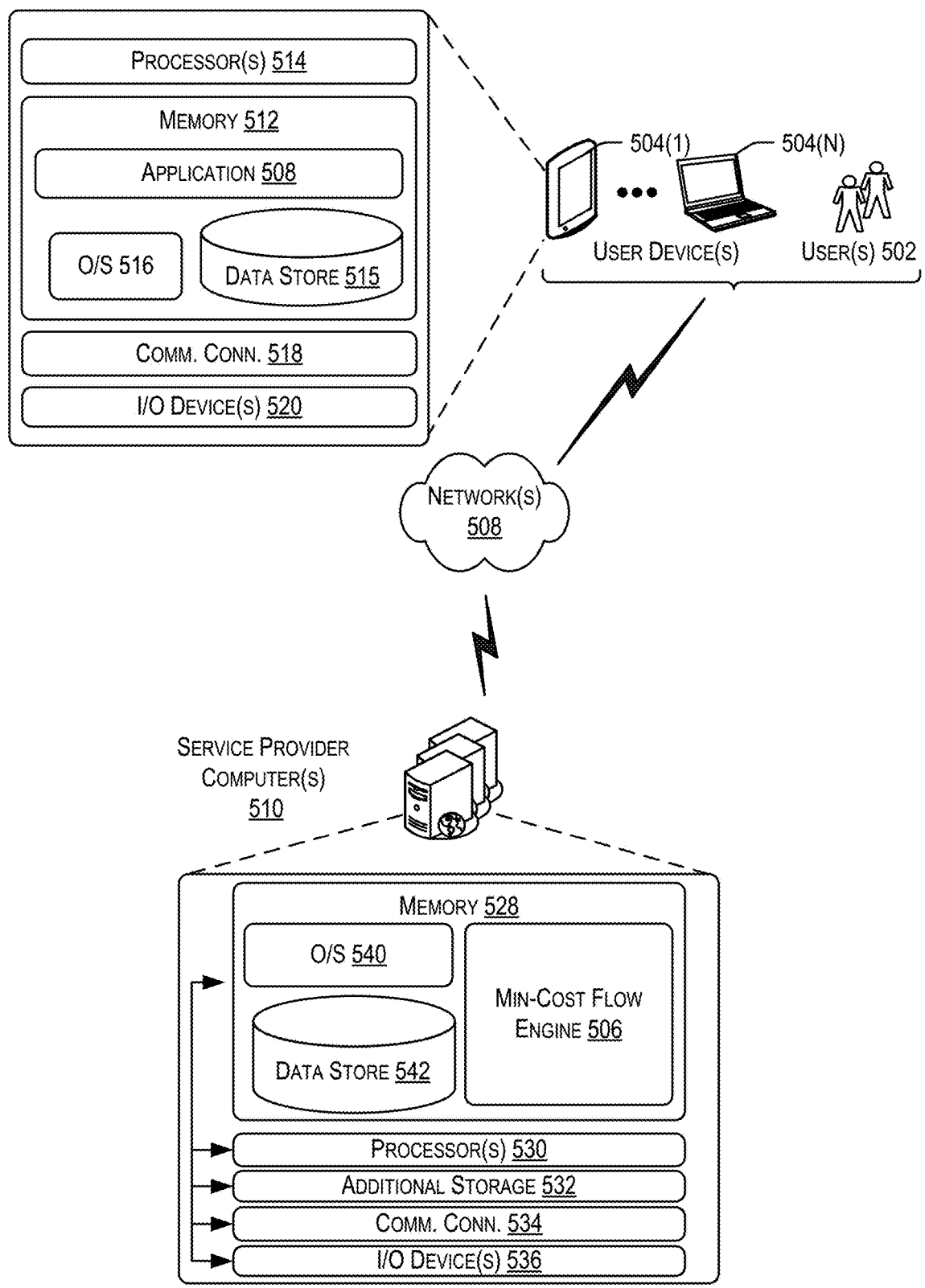
FIG. 5 illustrates a schematic diagram of an example computer architecture for providing the min-cost flow item recommendations, including a plurality of modules that may perform functions in accordance with at least one embodiment.

FIG. 5 illustrates components of an item recommendation system 500 according to at least one embodiment. In item recommendation system 500, one or more user(s) 502 may utilize one or more user device(s) 504(1)-(N) (e.g., any suitable computing device such as a smartphone, a tablet, a laptop, a desktop computer, etc.) to access digital content (e.g., a website, an online retailer, or the like). In some embodiments, the user device(s) 504 may access such digital content via an electronic marketplace hosted by the service provider computer(s) 510. By way of example, the user(s) 502 may utilize the application 508 (e.g., a browser application, a digital content application, a gaming application, an audio player application, a reading application, etc.) to navigate to a content provided by the service provider computer(s) 510 via an electronic marketplace. This content may be previously downloaded to the user device(s) 504 and/or the content may be access via a network page provided by the service provider computer(s) 510.

A min-cost flow engine 506 may, in some embodiments, be a component of the item recommendation system 500. In some embodiments, some portion of the min-cost flow engine 506 may operate at the user device(s) 504 and/or some portion of the min-cost flow engine 506 may operate at the service provider computer(s) 510. In some embodiments, the user device(s) 504 and service provider computer(s) 510 may communicate via networks 508 via the application 508 and/or through various application programming interfaces (APIs). In some aspects, the application 508 operating on the user device(s) 504, and/or the APIs, may be hosted, managed, and/or provided by a computing resources service or service provider, such as by utilizing one or more service provider computer(s) 510.

In some examples, the network(s) 508 may include any one or a combination of many different types of networks, such as cable networks, the Internet, wireless networks, cellular networks, and other private and/or public networks. While the illustrated example represents the user(s) 502 accessing application functionality over the network(s) 508, the described techniques may equally apply in instances where the user(s) 502 interact with the service provider computer(s) 510 via the one or more user device(s) 504 over a landline phone, via a kiosk, or in any other suitable manner. It should be appreciated that the described techniques may apply in other client/server arrangements, as well as in non-client/server arrangements (e.g., locally stored applications, etc.).

In some embodiments, the application 508 may provide a network page and/or user interfaces with which the user(s) 502 may select for download and/or access digital content hosted by the service provider computer(s) 510. The application 508 may be configured to provide digital content via a user interface (UI).

The service provider computer(s) 510, perhaps arranged in a cluster of servers or as a server farm, may host the application 508 operating on the user device(s) 504 and/or cloud-based software services. Other server architectures may also be used to host the application 508 and/or cloud-based software services. The application 508 operating on the user device(s) 504 may be capable of handling requests from the user(s) 502 and serving, in response, various user interfaces that can be rendered at the user device(s) 504. The application 508 operating on the user device(s) 504 can present any suitable type of network page and/or interface that supports user interaction with digital content. The described techniques can similarly be implemented outside of the application 508, such as with other applications running on the user device(s) 504.

The user device(s) 504 may be any suitable type of computing device such as, but not limited to a touch screen device, a smartphone, a personal digital assistant (PDA), a laptop computer, a desktop computer, a thin-client device, a wearable device (e.g., a smart watch), a tablet PC, an electronic book (e-book) reader, a music player device, etc. In some examples, the user device(s) 504 may be in communication with the service provider computer(s) 510 via the network(s) 508, or via other network connections.

In one illustrative configuration, the user device(s) 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs. Depending on the configuration and type of user computing device, the memory 512 may be volatile (such as random access memory (RAM)) and/or non-volatile (such as read-only memory (ROM), flash memory, etc.). The user device(s) 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the contents of the memory 512 in more detail, the memory 512 may include an operating system 516, one or more data stores 515, and one or more application programs, modules, or services for implementing the features of the min-cost flow engine 506 disclosed herein, provided via the application 508 (e.g., a browser application, a digital content application, etc.). The application 508 may be configured to receive, store, and/or display a network page or other interface for interacting with the service provider computer(s) 510. Additionally, the memory 512 and/or the data store 515 may be configured to store digital content data.

The user device(s) 504 may also contain communications connection(s) 518 that allow the user device(s) 504 to communicate with a stored database, another computing device or server (e.g., the service provider computer(s) 510), user terminals and/or other devices on the network(s) 508. The user device(s) 504 may also include I/O device(s) 520, such as a keyboard, a mouse, a pen, a voice input device, a touch input device, a display, speakers, a printer, etc.

In some aspects, the service provider computer(s) 510 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 510 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 510 may be in communication with the user device(s) 504 and/or other service providers via the network(s) 508 or via other network connections. The service provider computer(s) 510 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 510 may include at least one memory 528 and one or more processing units (or processor(s)) 530. The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of service provider computer(s) 510, the memory 528 may be volatile (such as RAM) and/or non-volatile (such as ROM, flash memory, etc.). The service provider computer(s) 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the service provider computer(s) 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 510 may also contain communications connection(s) 534 that allow the service provider computer(s) 510 to communicate with a stored database, another computing device (e.g., the user device(s) 504) or server, user terminals and/or other devices on the network(s) 508. The service provider computer(s) 510 may also include I/O device(s) 536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services for implementing the features disclosed herein, such as the features provided by the min-cost flow engine 506. In some examples, the min-cost flow engine 506 may be configured to implement the above-described techniques for offering items to users based at least in part on clustering, sequential processing, or a real-time implementation of solving the min-cost flow problem as described herein.

Figure 6:
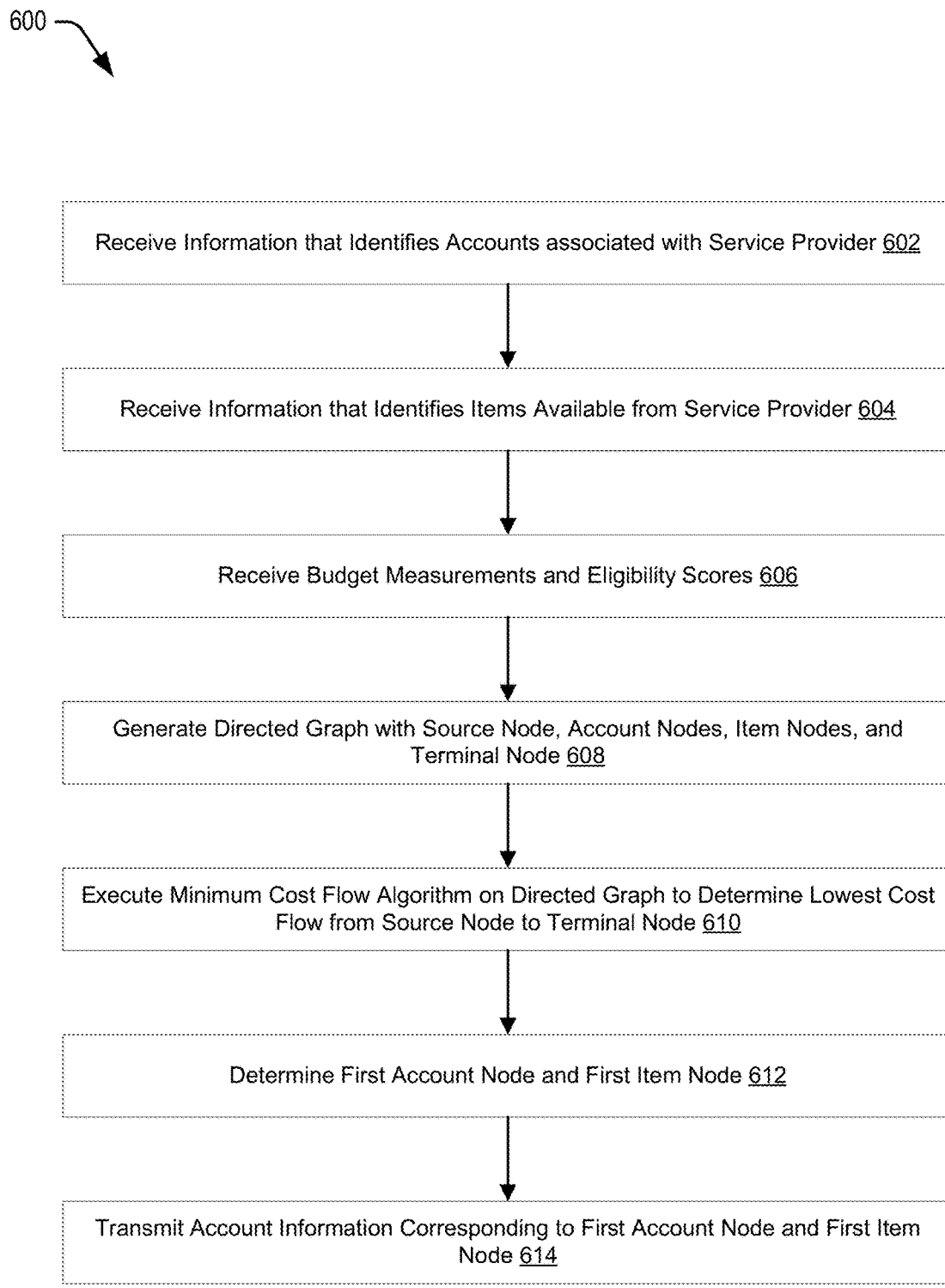
FIG. 6 illustrates a flowchart for an example method for providing the min-cost flow item recommendations, in accordance with at least one embodiment.

FIG. 6 is a flowchart illustrating an example method 600 for implementing the min-cost flow item recommendations described herein, in accordance with at least one embodiment. It should be appreciated that the operations of the method 600 may be performed in any suitable order, and not necessarily in the order depicted in FIG. 6. Further, the method 600 may include additional, or fewer operations than those depicted in FIG. 6. In some examples, the operations of method 600 may be performed by the min-cost flow engine 506 of FIG. 5. The computing device may include a processor and a memory storing computer-readable instructions that, upon execution by the processor, configure the computing device to perform the operations of the method 600.

The method 600 may begin at 602 where a service provider (e.g., a web service that implements min-cost flow calculations as a service) may receive information that identifies accounts associated with a different service provider (e.g., an online retailer). At 604, the service provider may receive information that identifies items available from the service provider. These items may be offers for items that are for sale and/or discounts (e.g., FTs, PTs, Hos, etc.) to memberships with the service provider. At 606, the service provider may also receive budget measurements and eligibility scores (e.g., as described above). In some examples, a single score for an account may provide computational efficiencies due to the decreased number of computations required to process the minimum cost flow solution. At 608, the service provider may generate a directed graph with a source node, account nodes, item nodes, and a terminal node.

Additionally, at 610, the service provider may execute a minimum cost flow algorithm on the directed graph. Based at least in part on execution of this algorithm, a resulting lowest cost flow for the routes from the source node to the terminal node may be determined. This lowest cost flow will include all the various routes through account nodes and item nodes. While each route may not be necessarily optimized individually (e.g., any given route on the graph may be cheaper in some examples, but the optimized flow is cheaper for the graph in total), the entire flow is optimized to the minimum cost for the flow (e.g., for the entire graph), and any routes on the optimized flow can be used to identify appropriate account/item node pairs. At 612, the service provider may identify the particular account node and the particular item node based at least in part on a review of the resulting lowest cost flow. At 614, the method 600 may end when the service provider transmits account information that corresponds to the particular account node and item information that corresponds to the particular item node. This information can then be used (e.g., by a different service provider) to make an offer to the identified account. The offer will be the identified item.

Figure 7:
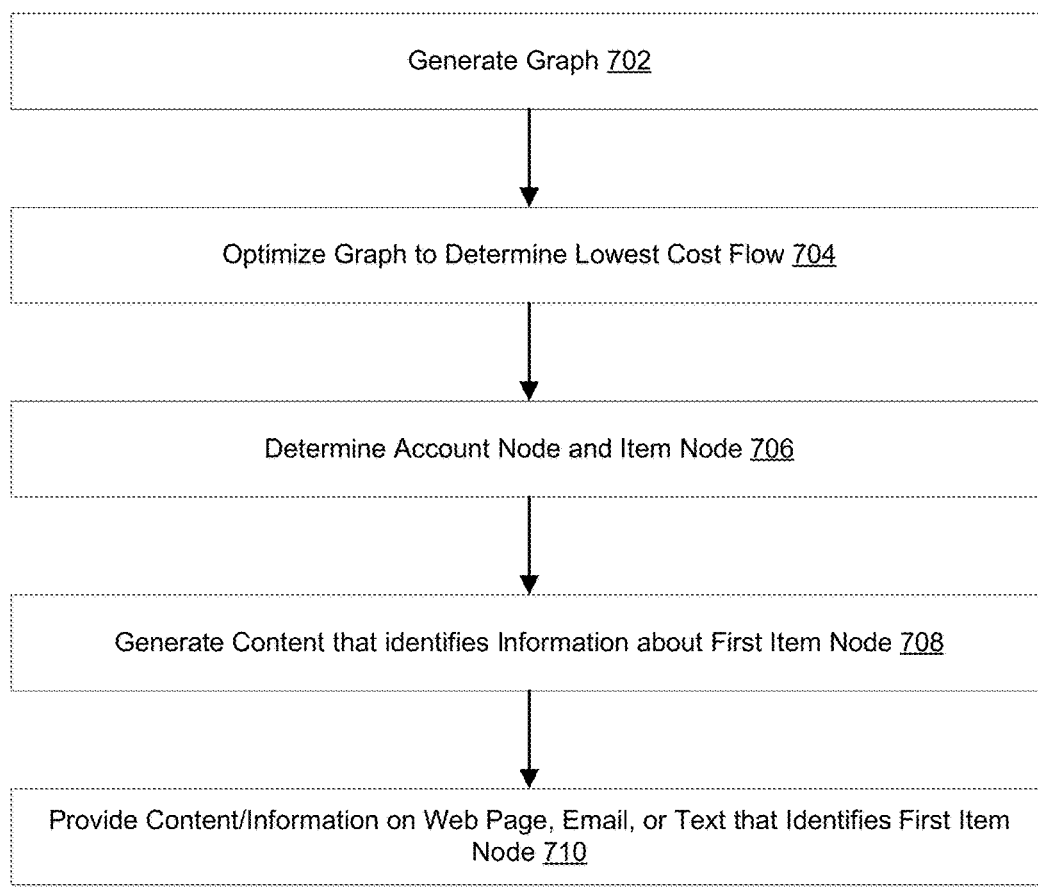
FIG. 7 illustrates a flowchart for an example method for providing the min-cost flow item recommendations, in accordance with at least one embodiment; and recommendation related to digital content, in accordance with at least one embodiment.

FIG. 7 is a flowchart illustrating another example method 700 for implementing the min-cost flow item recommendations described herein, in accordance with at least one embodiment. It should be appreciated that the operations of the method 700 may be performed in any suitable order, and not necessarily in the order depicted in FIG. 7. Further, the method 700 may include additional, or fewer operations than those depicted in FIG. 7. In some examples, the operations of method 700 may be performed by the min-cost flow engine 506 of FIG. 5. The computing device may include a processor and a memory storing computer-readable instructions that, upon execution by the processor, configure the computing device to perform the operations of the method 700.

The method 700 may begin at 702, a graph is generated to represent accounts and items associated with membership or potential membership with a service provider (e.g., an online retailer or the like). In this example, the service provider described may not be a web service that implements a min-cost flow recommendation service. Instead, the service provider here is the entity that makes item offers. At 704, the service provider may optimize the graph to determine a lowest cost flow. In some examples, optimizing the graph includes ensuring that the sum of the costs on each route is the minimum total cost possible for the network. Additionally, at 706, the service provider may determine an account node and item node that are on the lowest cost flow (e.g., any path on the optimized graph). Further, at 708, the service provider may generate content that identifies an item corresponding to the item node (e.g., an offer for a retail item, a membership, or a discount). At 710, the service provider may provide the content on a Web page, in an email, or in a text message to an account corresponding to the account node (e.g., a customer or potential customer). In some examples, the flow 700 provides the best way to distribute a set of items to a population of customers. For example, given a population of people, and a set of items to distribute to the population, the ultimate end state of utilizing the graph with flow 700 is that the items are distributed optimally to the population.

Figure 8:
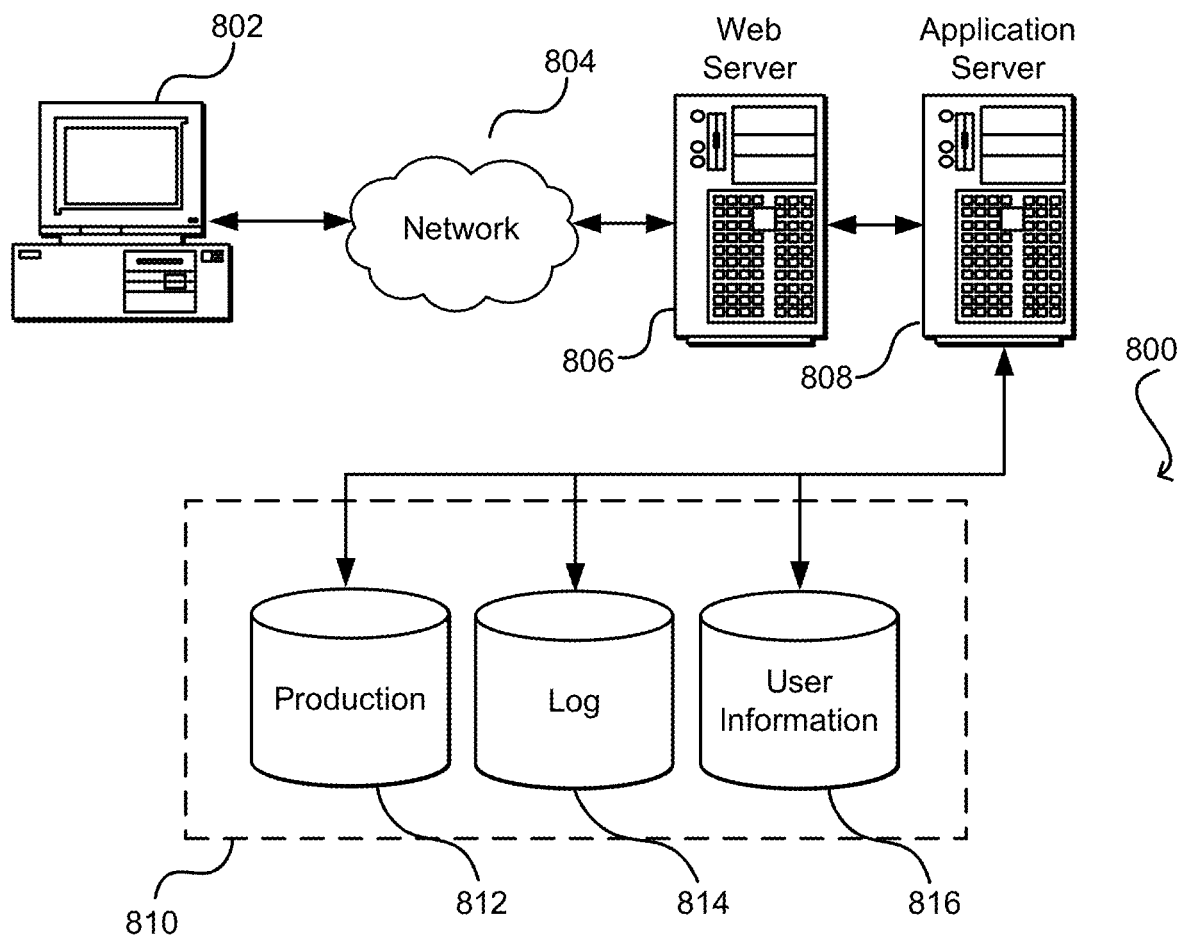
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), and Common Internet File System ("CIFS"). The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
receiving, by a computing system, first information that identifies a plurality of accounts associated with a service provider;
receiving, by the computing system, second information that identifies a plurality of items available from the service provider;
receiving, by the computing system, respective budget measurements for each item of the plurality of items;
receiving, by the computing system, respective eligibility scores for each account of the plurality of accounts with respect to each item of the plurality of items;
generating, by the computing system, a directed graph with a source node, a plurality of account nodes, a plurality of item nodes, and a terminal node, the source node comprising account edges directed towards each account node of the plurality of account nodes, each account node of the plurality of account nodes comprising item edges directed towards one or more item nodes of the plurality of item nodes based at least in part on the respective eligibility scores, and each item node of the plurality of item nodes comprising result edges directed towards the terminal node;
executing, by the computing system, a minimum cost flow algorithm on the directed graph by at least determining cost flows from the source node to the terminal node and selecting a lowest cost flow from the cost flows, each cost flow comprising a set of edges between the source node, a respective one of the plurality of account nodes, a respective one of the plurality of item nodes, and the terminal node and determined based at least in part on a budget measurement per edge of the set of edges;
determining, by the computing system, a first account node of the plurality of account nodes and a first item node of the plurality of item nodes, the first account node and the first item node included in the lowest cost flow;
generating, by the computing system, content based at least in part on item information corresponding to the first item node, the first item node associated with a first item, the content comprising a recommendation of the first item;

associating, by the computing system, the content with account information corresponding to the first account node;

receiving, by the computing system from a computing device associated with an account corresponding to the first account node, a request for a first web page of a web site;

determining, by the computing system, the account information based at least in part on a login of the computing device to the web site;

determining by the computing system, the content based at least in part on the account information;

generating, by the computing system, a web user interface (UI) element based at least in part on the content, the web UI element including the recommendation and a shortcut to a second web page that comprises additional content about the first item;

including, by the computing system, the web UI element in the first web page;

providing, by the computing system to the computing device, the first web page;

receiving, by the computing system from the computing device, a selection of the shortcut; and providing, by the computing system to the computing device, the second web page based at least in part on the selection of the shortcut.

2. The method of claim 1, wherein the first account node and the first item node are determined based at least in part on being on a path of the lowest cost flow.

3. The method of claim 1, wherein the service provider is configured to offer an item corresponding to the item information to the account corresponding to the account information.

4. The method of claim 1, wherein the respective eligibility scores identify whether each account of the plurality of accounts are eligible to receive each item of the plurality of items.

5. The method of claim 1, wherein the respective budget measurements identify a budget for providing each item of the plurality of items by the service provider.

6. A system, comprising:
a memory configured to store computer-executable instructions; and
one or more processors in communication with the memory and configured to execute the computer-executable instructions to at least:
generate a graph with a source node, a plurality of account nodes, a plurality of item nodes, and a terminal node, the source node comprising account edges directed towards each account node of the plurality of account nodes, each account node of the plurality of account nodes comprising item edges directed towards one or more item nodes of the plurality of item nodes based at least in part on the respective eligibility scores, and each item node of the plurality of item nodes comprising result edges directed towards the terminal node;
optimize the graph to determine a lowest cost flow from the source node to the terminal node based at least in part on respective budget measurements, the graph optimized by at least determining cost flows from the source node to the terminal node and selecting the lowest cost flow from the cost flows, each cost flow comprising a set of edges between the source node, a respective one of the plurality of account nodes, a respective one of the plurality of item nodes, and the terminal node and determined based at least in part on a budget measurement per edge of the set of edges;
determine a first account node of the plurality of account nodes and a first item node of the plurality of item nodes, the first account node and the first item node included in the lowest cost flow;
generate content that identifies information about the first item node of the plurality of item nodes, the first item node associated with a first item, the content including a recommendation of the first item;
associate the content with account information corresponding to the first account node;
receive, from a computing device associated with an account corresponding to the first account node, a request for accessing a first network document;
determine the account information based at least in part on the request;
determine the content based at least in part on the account information;
generate a user interface (UI) element based at least in part on the content, the UI element comprising the recommendation and a shortcut to a second network document that comprises additional content about the first item;
include the UI element in the first network document;
provide, to the computing device, the first network document;
receive, from the computing device, a selection of the shortcut; and
provide, to the computing device, the second network document based at least in part on the selection of the shortcut.

7. The system of claim 6, wherein the one or more processors are further configured to execute the computer-executable instructions to at least generate a plurality of account clusters based at least in part on feature similarities.

8. The system of claim 7, wherein the plurality of account nodes in the graph include accounts from a particular account cluster of the plurality of account clusters.

9. The system of claim 6, wherein the one or more processors are further configured to execute the computer-executable instructions to at least:
generate a plurality of propensity models for the graph; and
generate a plurality of classes for the plurality of propensity models.

10. The system of claim 9, wherein the one or more processors are further configured to execute the computer-executable instructions to at least:
receive information identifying a new account;
determine a respective propensity score of the new account for each of the plurality of propensity models, each respective propensity score identifying a likelihood that the account belongs to each respective class;
multiply each propensity score by a penalty function that is based at least in part on a remaining budget of each class of the plurality of classes; and
retrain the plurality of propensity models.

11. The system of claim 6, wherein the graph is optimized at two different time periods.

12. The system of claim 11, wherein the graph is optimized simultaneously during a first time period of the two different time periods, and wherein the graph is optimized using second respective budget measurements.

13. The system of claim 6, wherein optimizing the graph comprises executing a minimum cost flow algorithm on the graph, and wherein the minimum cost flow algorithm is executed using the respective budget measurements as costs for each edge of the result edges of the graph.

14. The system of claim 13, wherein the one or more processors are further configured to execute the computer-executable instructions to at least:
provide, to the computing device, a third network page that presents the content.

15. A non-transitory computer-readable storage medium storing computer-executable instructions that, when executed by one or more processors, configure the one or more processor to perform operations comprising:
generating a graph with a source node, a plurality of account nodes, a plurality of item nodes, and a terminal node, the source node comprising account edges directed towards each account node of the plurality of account nodes, each account node of the plurality of account nodes comprising item edges directed towards one or more item nodes of the plurality of item nodes based at least in part on the respective eligibility scores, and each item node of the plurality of item nodes comprising result edges directed towards the terminal node;
optimizing the graph to determine a lowest cost flow from the source node to the terminal node based at least in part on respective budget measurements, the graph optimized by at least determining cost flows from the source node to the terminal node and selecting the lowest cost flow from the cost flows, each cost flow comprising a set of edges between the source node, a respective one of the plurality of account nodes, a respective one of the plurality of item nodes, and the terminal node and determined based at least in part on a budget measurement per edge of the set of edges;
determining a first account node of the plurality of account nodes and a first item node of the plurality of item nodes, the first account node and the first item node included in the lowest cost flow;
generating content that identifies information about the first item node of the plurality of item nodes, the first item node associated with a first item, the content including a recommendation of the first item;
associating the content with account information corresponding to the first account node;
receiving, from a computing device associated with an account corresponding to the first account node, a request for accessing a first network document;
determining the account information based at least in part on the request;
determining the content based at least in part on the account information;
generating a user interface (UI) element based at least in part on the content, the UI element comprising the recommendation and a shortcut to a second network document that comprises additional content about the first item;
including the UI element in the first network document;
providing, to the computing device, the first network document;
receiving, from the computing device, a selection of the shortcut; and
providing, to the computing device, the second network document based at least in part on the selection of the shortcut.

16. The non-transitory computer-readable storage medium of claim 15, wherein the first account node and the first item node are determined based at least in part on being on a path of the lowest cost flow.

17. The non-transitory computer-readable storage medium of claim 15, further comprising transmitting the content in an electronic message or a network document.

18. The non-transitory computer-readable storage medium of claim 15, wherein the content shows a discount offer from a service provider.

19. The non-transitory computer-readable storage medium of claim 15, wherein the respective eligibility scores identify whether each account node of the plurality of account nodes is eligible to receive each item of a plurality of items that correspond to the plurality of item nodes.

20. The non-transitory computer-readable storage medium of claim 15, wherein the respective budget measurements identify a budget for providing each item of the plurality of items by a service provider.

* * * * *